Patented Mar. 28, 1950

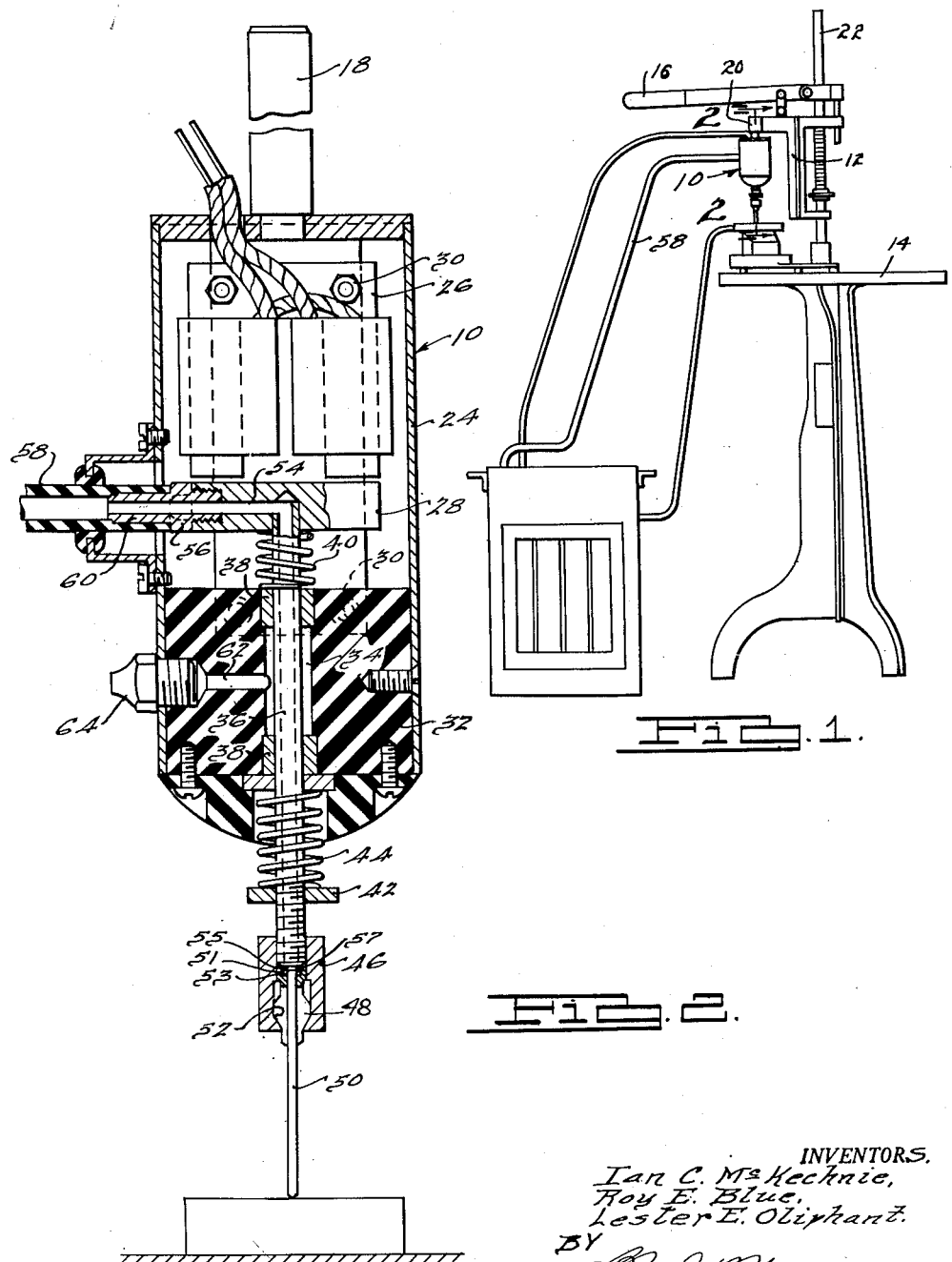

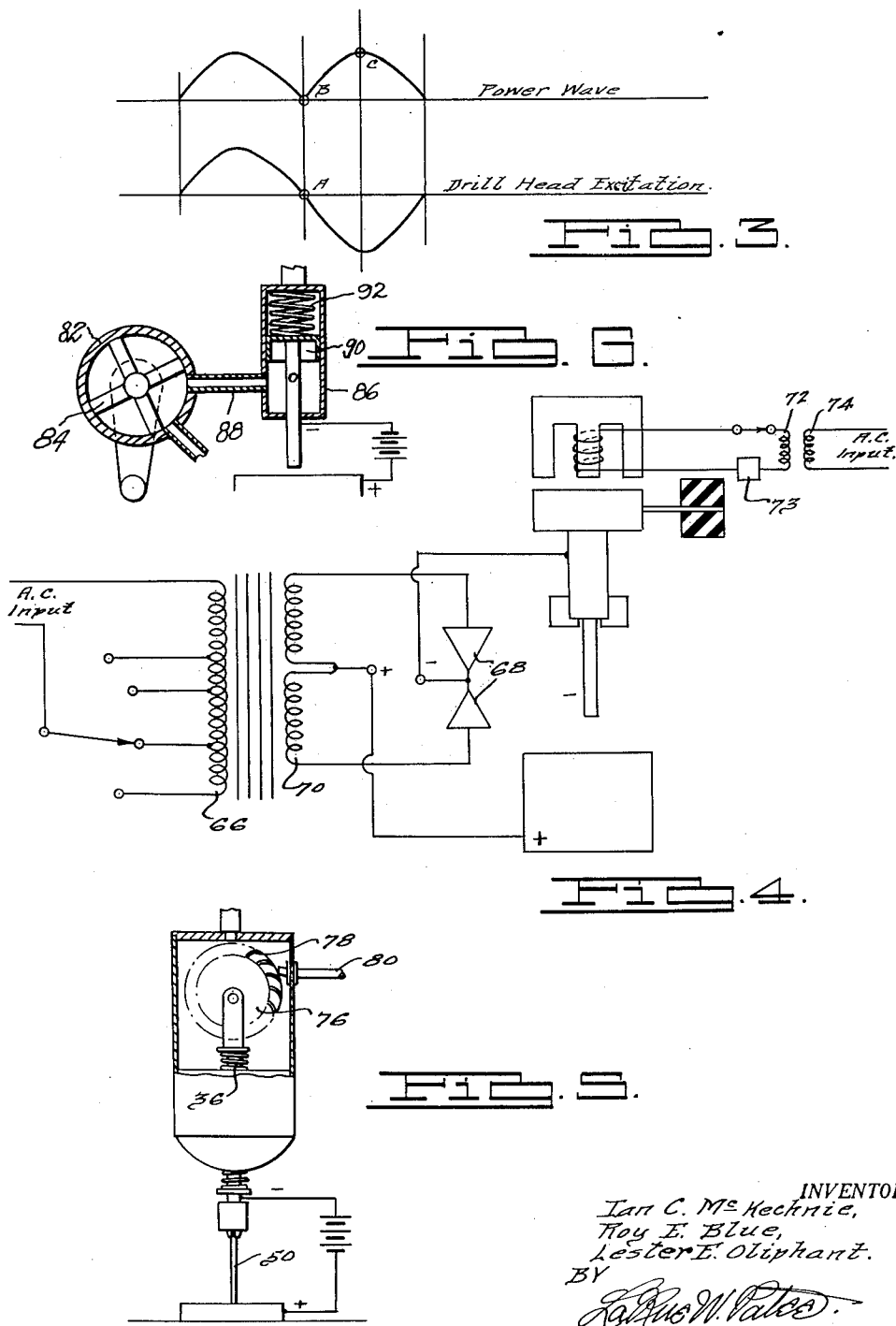

2,501,954

UNITED STATES PATENT OFFICE 2,501,954

ELECTRIC ARC DRILL

Ian C. McKechnie, Roy E. Blue, and Lester E. Oliphant, Detroit, Mich.

Application June 28, 1945, Serial No. 602,010

5 Claims. (Cl. 219—15)

This invention relates to a method and apparatus for removing material from a workpiece by the use of an electrical arc between a tool, as an electrode and a workpiece as the other electrode. More particularly the invention relates to the forming of a series of intermittent electric arcs between a tool and a workpiece which causes vaporization of the workpiece, the vaporized material then being condensed by a coolant forced through the arc and washed away, not readhering to the workpiece.

An object of the invention is to provide a tool having its working end of the approximate size and shape of the material to be removed from, or aperture to be made in the workpiece, usually, although not necessarily, tubular to allow the passage of coolant.

Another object of the invention is to use an unidirectional current with the negative terminal connected to the tool and the positive to the work, which permits more rapid removal of the material of the workpiece without too rapid vaporization of the tool.

A further object is to synchronize and phase the oscillations of the tool with pulsations of the electrical potential applied between the tool and the work to obtain maximum speed of operation.

A further object is to provide means of establishing and extinguishing the arc between the tool and the workpiece at rapid intervals while permitting maximum flow of current through the arc, so that the temperature of the workpiece material immediately adjacent to the portion to be removed is not affected.

Other objects and advantages of the invention will be more fully understood from the following description taken in connection with the accompanying drawings in which:

Fig. 1 is a side elevational view showing our improved device as applied to a supporting frame;

Fig. 2 is a sectional view showing the operating head for vibrating the tool;

Fig. 3 is a diagrammatic view illustrating the relationship of the power wave and the drill head excitation wave;

Fig. 4 is a wiring diagram illustrating diagrammatically a preferred circuit used in the device;

Fig. 5 is a view illustrating a modified form of reciprocating mechanism for the drill; and Fig. 6 is a sectional view illustrating a further modification of the invention.

Referring to the drawings, there is illustrated one form of a device for carrying out the invention. A head 10 is mounted in a supporting frame structure 12, having a face plate 14 for receiving the work, and the head is vertically movable toward and away from the work through a lever 16 clamped to the supporting frame structure 12.

The head 10 is carried by a shank 18 which is received in a chuck 20 on the vertically movable shaft 22 in the supporting frame structure 12. Referring to Fig. 2, the head 10 comprises a casing 24 having an electromagnet 26 therein and a reciprocating body 28. The magnet 26 is secured to the wall of the housing 24 by screws 30. An insulating block 32 is mounted in the housing 24 and is provided with a central passage 34 through which extends a tubular member 36 having its upper end secured to the body 28. Bushings 38 guide the tube 36 for reciprocation with the body 28. A coil spring 40 is positioned around the tube 36 and has its opposite ends abutting the body 28 and block 32 respectively.

The lower end of the tube 36 projects beyond the lower end of the housing 24 and has its outer periphery screw-threaded for the reception of an adjusting nut 42. A coil spring 44 surrounds the tube 36 and has its opposite ends abutting the end of the housing 24 and the nut 42 respectively. The two springs 40 and 44 and the nut 42 are for the purpose of adjusting the body 28 relative to the magnet 26 and to adjust the natural frequency of the reciprocating tool.

Screw threaded on the lower end of the tube 36 is a shouldered sleeve 46 which secures a collet 48 in axial alignment with the tube 36. The collet is a self contained sealing unit for the tool 50 which is the negative electrode of the device. The collet has its side walls split longitudinally throughout a portion of its length and has an opening therethrough for receiving the tool 50. A tapered shoulder 52 receives a correspondingly tapered surface on the sleeve 46 for holding the collet at the end of the tube 36 and also serves to pinch the split end portions of the collet tightly on the outer periphery of the tool 50.

A counter bore 51 is formed in the upper end of the collet. A packing 53 in the form of a washer, is received in the counter bore. Another counter bore 55 is formed in the collet end to receive a washer 57 which is press fitted into the counterbore 55 for holding the packing in position. The packing 53 tightly engages the outer periphery of the tool 50 thereby forming a liquid seal.

The body 28 is provided with a lateral passage 54 communicating with the longitudinal passage in the tube 36. A tubular fitting 56 is screw threaded into the body 28 and a flexible tubular member 58 is fitted over a reduced portion 60 of the fitting 56. The tube 58 is connected to a coolant pressure supply, not shown.

The tool 50 is tubular and may be of any desired size or shape depending upon the size and shape of the opening to be formed in the work. In the form illustrated the tool is round.

From the above description it will be understood that coolant under pressure will flow through the tube 58, fitting 56, passage 54, tube 36 and tool 50.

A lateral passage 62 is formed in the block 32 and is extended through the housing 24. The passage 62 receives a lubricating fitting 64 through which lubricant is supplied to the central passage 34 for lubricating the reciprocating tube 36 in the bushings 38.

In Fig. 4 there is illustrated one means of control for the tool and a separate means for controlling the arc. A pulsating uni-directional potential, obtained by rectifying A. C. is illustrated to permit increased power input and still give interruption of the arc. An A. C. input is connected to the tapped primary winding 66 of a transformer. Rectifiers 68 are connected in series with the secondary winding 70 and the positive lead is connected between the center of the secondary 70 and the work. The negative lead is connected between the rectifiers 68 and the tool. The armature for vibrating the tool has its winding connected to a variable voltage secondary winding 72 and a primary winding 74 is connected to an A. C. input. The variable voltage of the secondary 72 provides a means for altering the amplitude of the vibrating tool. The variable voltage in the primary 66 provides a means for altering the current supply for the arc.

The use of negative tool and positive work electrical polarity is highly desirable. Electrons then flow from the tool to the work in the arc, vaporized ions of the work material flow from the work toward the tool. The ions of the work material are condensed by the coolant and washed away without depositing on the tool and there is no tendency for the tool to vaporize and deposit on the work.

The phase relationship between the drill head stroke and the power wave has a definite bearing on the action of the electric arc drill.

Fig. 3 diagrammatically shows the relationship of the power wave and the drill head excitation wave. The drill head is built to strike the arc at the instant the tool is farthest away from the poles.

If the action of the drill head armature were in phase with its power supply, then the bottom of the stroke would occur at point A, Fig. 3, and contact would occur at point B on the power wave. This never actually occurs, however, due to inductance in the drill head magnet and hysterisis effect. There is also some effect caused by the proximity of the resonant frequency of the head to the exciting frequency, in this instance, if commercial power is used, 60 cycles or 120 strokes per second. Actually contact is made somewhere between points B and C of Fig. 3 due to this lag effect.

Experience indicates that in general use, contact should be made approximately 26 to 30 electrical degrees ahead of point C. Earlier contact with the same power applied, gives a longer arc time at a somewhat lower R. M. S. voltage and increased R. M. S. amps, while later contact gives a shorter arc time with higher R. M. S. voltage and reduced R. M. S. amperes.

By means of inserting a phase shifting circuit 73 having the current amount of inductance, resistance or capacity as needed, or changing the resonant frequency of the drill head armature, the desired phase relationship between the drill head stroke and the arc input pulses may be obtained.

The invention may also be carried out by the use of uni-directional constant electrical potential connected between the tool and the work with the tool connected to the negative terminal and the work to the positive as illustrated in Fig. 5.

In this case it is highly desirable to use high coolant pressure to assist in extinguishing the arc as the tool in its oscillations moves away from the work, if maximum power input with resulting maximum speed is to be obtained.

Further increase in speed may be obtained by more rapid reciprocation of the tool than is possible electro-magnetically from commercial power supply of 60 cycles A. C.

As illustrated in Fig. 5, the more rapid reciprocation of the tool is obtained by rotatably driving an eccentric member 76 carried by the tube 36. As shown, an air pressure is directed against blades 78 through tube 80 and functions as an air motor.

A further method of carrying out the invention is illustrated in Fig. 6, where coolant under pressure is supplied to a unit 82 which when the rotor 84 is rotated, acts as a valve to rapidly supply and shut off coolant supplied to the tool 86 through conduit 88. With the electric potential between the tool and the work high enough and tool close enough to the work an electric arc is formed when the coolant pressure is zero and extinguished when the pressure is increased.

Movement of the tool may also be obtained, to facilitate establishing and extinguishing the arc, by means of a piston 90 which is affected by the coolant pressure so as to lift the tool with increase in pressure, but controlled in its movement by the spring 92.

From the foregoing it will be seen that by forcing a coolant through an intermittent electric arc, preferably having positive work polarity and fixing the proper phase relationship between an oscillating tool and a pulsating power wave, preferably 25 to 30 electrical degrees prior to the maximum point of the power wave; or using high frequency mechanical or electrical oscillation of the tool with uni-directional constant potential power and high coolant pressure; or other variations as described depending on which is the most suitable for the particular application involved, we have obtained a device of new and novel design and considerable usefulness.

It will be understood that the invention embodies many variations and different combination of circuits to obtain the results above set forth and it is not our intention to limit its scope other than by the terms of the appended claims.

We claim:

1. The method of removing material from a workpiece which consists in creating a series of intermittent electric arcs between a tool and a workpiece by means of rapid pulsations in a uni-directional electric potential having its negative terminal connected to the tool and positive to the workpiece, the peaks of the applied potential being of sufficient magnitude to ionize and start the arc and the low points of the applied potential being of sufficiently low magnitude to permit extinguishment of the arc, and passing a coolant through the arc to extinguish the arc.

2. The method of removing material from a workpiece which consists in creating a series of intermittent electric arcs between a tool at a uni-directional negative pulsating electric potential with respect to the workpiece by means of rapidly reciprocating the tool toward and away from the workpiece, the reciprocating motion of the tool being synchronized and phased with the pulsations of the electric potential between the tool and the workpiece so that the tool reaches the portion of its stroke closest to the workpiece as a pulsation of the electric potential is rising toward or in the vicinity of its maximum magnitude, and passing a coolant through the arc thus formed to extinguish the arc.

3. The method of removing material from a workpiece which consists of creating a series of intermittent electric arcs between a tool and a workpiece by means of rapid pulsations in a uni-directional electric potential having one side connected to the tool and the other to the workpiece, the peaks of the applied potential being of sufficient magnitude to start the arc and the low points of applied potential being sufficiently low to permit extinguishing of the arc by passing a coolant through the arc.

4. The method of removing material from a workpiece which consists in providing relative movement between a tool and the workpiece, a source of unidirectional pulsating electrical potential connected one side to the tool and the other side to the workpiece so that a series of electric arcs are formed as the tool moves closest to the workpiece and extinguished by a coolant forced through the arc as the tool moves away from the workpiece.

5. The method of removing material from a workpiece which consists in intermittently forming an electric arc supplied by direct current voltage between a tool and the workpiece, the positive electrode connected to the work and the negative to the tool with the voltage being of sufficient magnitude to start the arc as the tool approaches closest to the workpiece, and directing coolant under pressure of sufficient magnitude at the arc to extinguish same as the tool moves away from the workpiece.

IAN C. McKECHNIE.
ROY E. BLUE.
LESTER E. OLIPHANT.

REFERENCES CITED

The following references are of record in the file of this patent:

UNITED STATES PATENTS

| Number | Name | Date |
|---|---|---|
| 561,367 | Badger | June 2, 1896 |
| 650,124 | Coleman | May 22, 1900 |
| 857,247 | Menne | June 18, 1907 |
| 866,498 | Meune et al. | Sept. 17, 1907 |
| 1,324,337 | Chapman et al. | Dec. 9, 1919 |
| 1,984,809 | Requa | Dec. 18, 1934 |
| 2,079,310 | Bennett | May 4, 1937 |
| 2,139,160 | Hebeler | Dec. 6, 1938 |
| 2,173,450 | Larsen et al. | Sept. 19, 1939 |
| 2,383,382 | Harding | Aug. 21, 1945 |
| 2,385,665 | Warwick | Sept. 25, 1945 |
| 2,399,212 | Dawson et al. | Apr. 30, 1946 |
| 2,427,588 | Burnett | Sept. 16, 1947 |

OTHER REFERENCES

"The Iron Age," May 4, 1904, pages 60–61.